United States Patent [19]
Roehl

[11] Patent Number: 5,159,918
[45] Date of Patent: Nov. 3, 1992

[54] HOT WATER STORAGE TANK FOR SOLAR COLLECTORS

[75] Inventor: James S. Roehl, Fredericksburg, Va.

[73] Assignee: The United States of America as represented by the Secretary of the Navy, Washington, D.C.

[21] Appl. No.: 841,699

[22] Filed: Feb. 26, 1992

[51] Int. Cl.5 .............................................. F24J 2/04
[52] U.S. Cl. .................................... 126/437; 126/427
[58] Field of Search ............... 126/437, 427, 435, 428, 126/433, 434, 450, 417, 362, 422, 400

[56] References Cited

U.S. PATENT DOCUMENTS

| | | | |
|---|---|---|---|
| 4,010,734 | 3/1977 | Chayet | 126/437 |
| 4,137,900 | 2/1979 | Brautigam | 126/437 |
| 4,253,446 | 3/1981 | Muller | 126/435 |
| 4,324,228 | 4/1982 | Shippee | 126/437 |
| 4,343,293 | 8/1982 | Thomason et al. | 126/400 |
| 4,465,059 | 8/1984 | French | 126/433 |
| 4,598,694 | 7/1986 | Cromer | 126/437 |
| 4,727,856 | 3/1988 | Morse | 126/437 |
| 4,898,152 | 2/1990 | Kahl | 126/422 |

FOREIGN PATENT DOCUMENTS

| | | | |
|---|---|---|---|
| 2722888 | 11/1978 | Fed. Rep. of Germany | 126/437 |
| 90557 | 6/1982 | Japan | 126/437 |

Primary Examiner—James C. Yeung
Attorney, Agent, or Firm—John D. Lewis; Jacob Shuster

[57] ABSTRACT

A baffled hot storage tank for solar collector systems is provided. The tank includes a concentric cylindrical baffle having a circulation port at the bottom of the baffle and another circulation port at the top of the baffle. This configuration restricts the mixing of water allowing both a vertical temperature gradient and a lateral gradient to be maintained. The maintaining of hot water at the desired supply termperature is restricted to only the upper section of the center core inside the baffle. This location reduces radiant heat loss. Additionally, inlet and outlet pipes are also positioned to take advantage of the tank temperature gradients.

8 Claims, 3 Drawing Sheets

HOT WATER STORAGE TANK FOR SOLAR COLLECTORS

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention is related to the field of hot water storage system and more particularly to the storage of hot water for direct heating from solar collectors.

BACKGROUND OF THE INVENTION

Hot water storage tanks for use with solar collector systems have developed in two different types of direct heaters. A first type uses a preheater tank and also a conventional hot water tank. Heat from the solar collector is transferred to the water in the preheat tank. As the hot water from the conventional water heater is used, it is replaced with water from the preheater storage tank which in turn is replaced by cold water from the supply. In this configuration, heat from the collectors is used to preheat the water and store it in the preheater tank. As a result, the preheater tank has radiant heat losses. The water then goes to the conventional water tank where it is further heated electrically. This conventional water tank also has radiant heat loss. The combined heat loss from both the preheat tank and the conventional tank causes a low system efficiency.

In a second type of direct heater, water is circulated between the solar heater and the main or conventional hot water storage tank. Although the number of components are reduced, thereby reducing costs, and although the reduced number of components likewise reduces the radiant losses associated with component surface areas, the integrated system can have even lower efficiency. The problem lies in the temperature differential between the water in the collector panels and the water in the storage tank. When only a small differential exists, that is, the storage tank is maintained at a relatively high temperature compared with the temperature of the solar panels, the transfer of heat will be small and the efficiency of the system will be marginal. Since operating temperatures of solar panels can range in the area of 130°-140° F., it is even possible to have the solar collector cooling the hot storage if the supplemental heater is set to a temperature higher than that of the solar panels. In fact, the usual warming of the storage tank water greatly diminishes the storage capacity of a solar hot water system. As a result, the single storage tank method has proven to be inefficient to the point of being uneconomic.

The problem of single tank inefficiency has been attacked in various ways. An example is U.S. Pat. No. 4,253,446, Müller wherein a separating wall divides a single tank into an upper and lower portion. Although this arrangement improves the efficiency of the solar panel heat transfer, the problem of radiant heat loss remains. The overall functional effect of the Müller arrangement is to stack a preheater tank vertically below a main storage tank. Because of the loss of volume of the main storage, that is, the upper portion of the tank, it is necessary to increase the temperature of the upper portion (to maintain capacity) or to physically increase the volume of the upper portion. In either case, the upper portion will experience increased radiant heat loss and therefore decreased efficiency. What is needed is a tank providing a temperature gradient where cooler water is located near the storage tank surface and hot water is located away from the tank surface.

SUMMARY OF THE INVENTION

It is an object of the invention to provide a hot water storage tank having a temperature gradient within the tank which provides a lower temperature water for a solar collector.

It is another object of the invention to provide a hot water storage tank having a temperature gradient within the tank which reduces radiated heat loss.

It is a further object of the invention to provide a hot water storage tank having both a vertical and a horizontal temperature gradient.

It is yet another object of the invention to provide a hot water storage tank having baffled sections having vertical separations between storage volumes.

The invention is a cylindrical hot water storage tank for use with a solar collector system. The storage tank has an internal vertical cylindrical baffle by which two concentric storage volumes are formed, an outer annular volume and an inner cylindrical volume. Circulation to and between the storage volumes is designed to result in the coolest available water going to the solar collector. Circulation design also results in a hot inner volume and a warm outer volume, in effect wrapping the solar preheat tank around the hot core which acts as the conventional hot water storage.

DETAILED DESCRIPTION OF THE INVENTION

Figure 1:
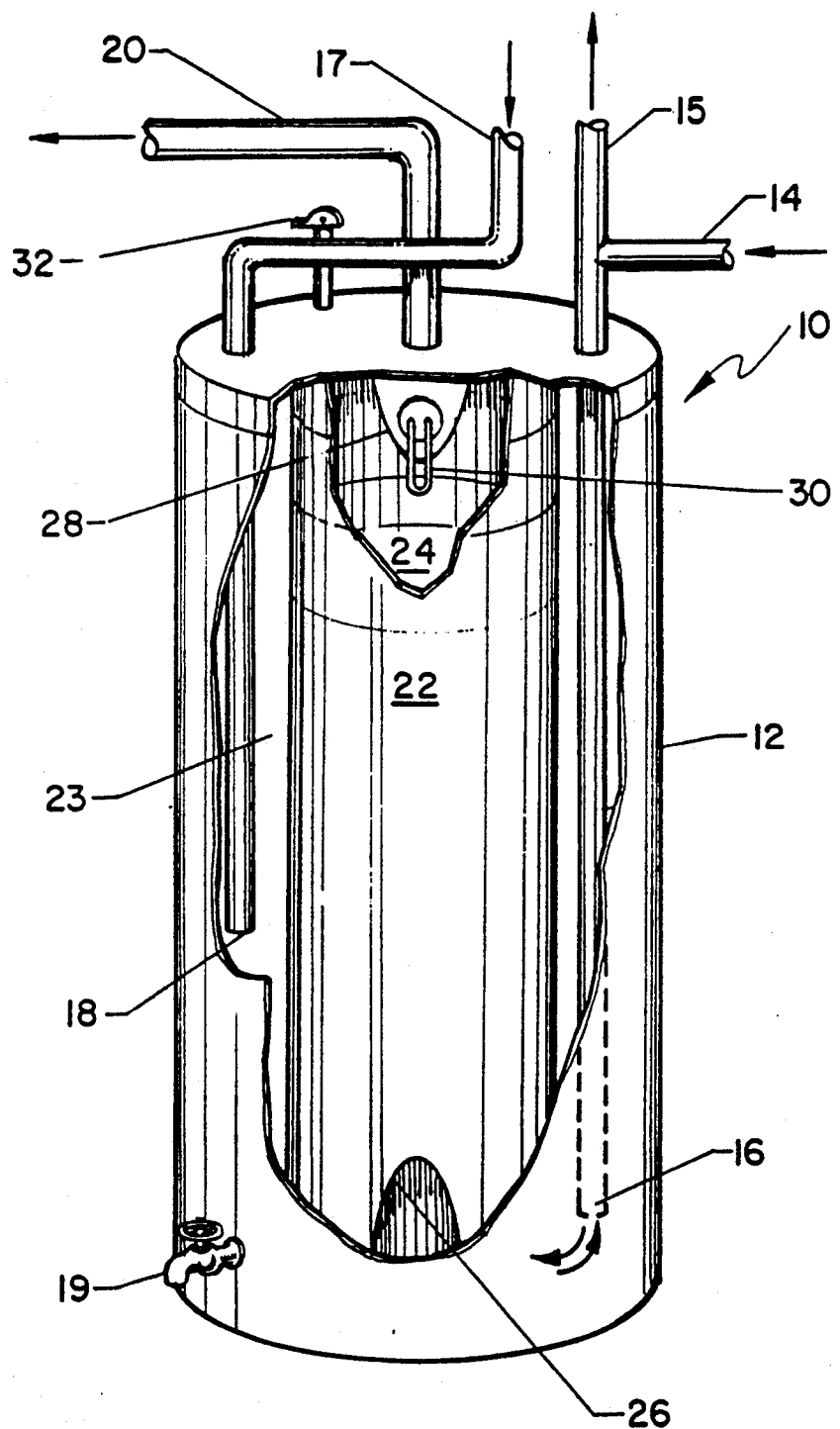
FIG. 1 is a perspective cutaway view of the hot water storage tank.

Referring now to FIG. 1, the hot water storage tank, denoted generally by the reference numeral 10, is shown in a cutaway. The configuration of the hot water storage tank 10 combined with flow control, both within the tank and to and from the tank, provide a high degree of efficiency when used with a solar collector. The outer tank shell 12 is a conventionally constructed and insulated hot water storage tank. Cold water is supplied to the tank 10 through supply pipe 14 which provides water either to a solar panel through solar inlet pipe 15 or directly to the lower portion of the tank 10 through cold water inlet pipe 16. Water traveling to a solar panel through solar inlet pipe 15 returns to tank 10 through solar return pipe 17 and empties into tank 10 at a level approximately one-third of the tank height from the bottom at solar return outlet 18. A drain 19 is provided to empty the tank 10 and hot water is supplied from the tank through hot water supply pipe 20. A concentric baffle 22 forms an outer annular storage volume 23 and an inner cylindrical storage volume 24. Baffle 22 has a lower circulation port 26 and an upper circulation port 28 thereby allowing controlled exchange of water between the outer and inner volumes. A supplemental heating element 30 provides for additional heating of the stored water as needed to compensate for variations in solar collector return water and to provide an added temperature increase if needed. Also, a relief valve 32 is provided in case of overheating.

The configuration of the baffle 22 in combination with circulation port locations and solar inlet and return locations provides the novel features. This configuration creates a hot water storage tank having two temperature gradients, a first gradient diametrically across the tank and a second gradient vertically. These two gradients provide two novel functions within the tank 10. First, radiant heat losses are greatly reduced, and second, the coldest water available is always directed to the solar panels while the hottest water is directed to the hot water supply pipe 20.

Figure 2:
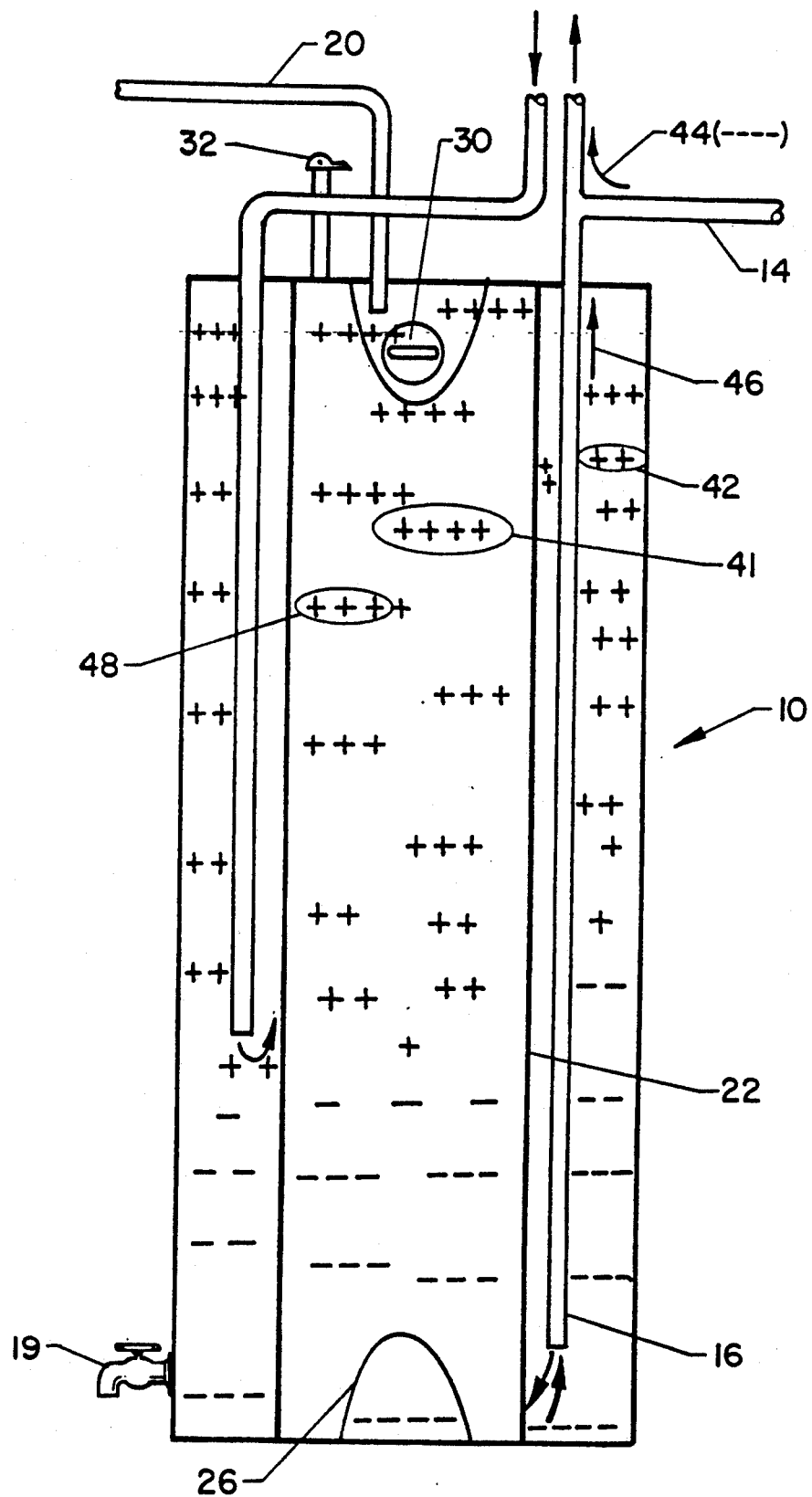
FIG. 2 is a side view of the hot water storage tank.

Operation of the tank 10 may be more fully seen by reference to FIG. 2. The tank gradient is represented by "+" and "−" symbols showing relative temperature; "++++" is full temperature hot water; "−−−−" is the entering cold water. Temperature symbol 41 shows a full temperature inner core while temperature symbol 42 shows a much cooler temperature than the adjacent outer volume temperature. The baffle 22 allows the separation of solar heated water, represented by temperature symbol 42, and the full temperature hot water, represented by temperature symbol 41, which is provided to the hot water supply pipe 20. This temperature gradient within tank 10 maintains hot water in the inner core and warm water surrounding the core. As a result, the radiant heat losses from the inner volume are greatly reduced. This reduction occurs by two mechanisms. The first effect occurs because the temperature differential between the inner volume and the outer annular volume is much smaller compared to a conventional tank. The heat transfer is thereby reduced. Second, any heat lost from the inner volume is gained by the outer volume, thereby effectively recovering all inner volume heat losses in the lateral or horizontal direction. Heat loss from the outer volume is low due to the lower temperature of the outer volume, typically similar to that of a conventional pre-heat tank.

The vertical temperature gradient allows increased efficiency of the solar panels by insuring that the coldest available water is directed to the solar collector panels. When water is drawn from hot water supply pipe 20, incoming cold water through pipe 14 flows directly to the solar panels as represented by arrow 44. When no demand is on the system, the solar panels receive water from pipe 16 as shown by arrow 46. This water due to the vertical gradient is the coldest water in the outer storage volume. By providing colder water to the solar collectors, efficiency of the collectors is increased. The design avoids the convention single tank problem where relatively hot water (++++) can be sent to the collector which then acts, not as a collector, but as a radiator, returning warm water (+++) 48. Any source of heat may be used with this tank. It is not necessary to use solar panels. Waste heat from air conditioning or refrigerator units may be used as a heat source, for example. In those cases, the same principles apply and the tank configuration will avoid the potential problem of the collector acting as a radiator.

Figure 3:
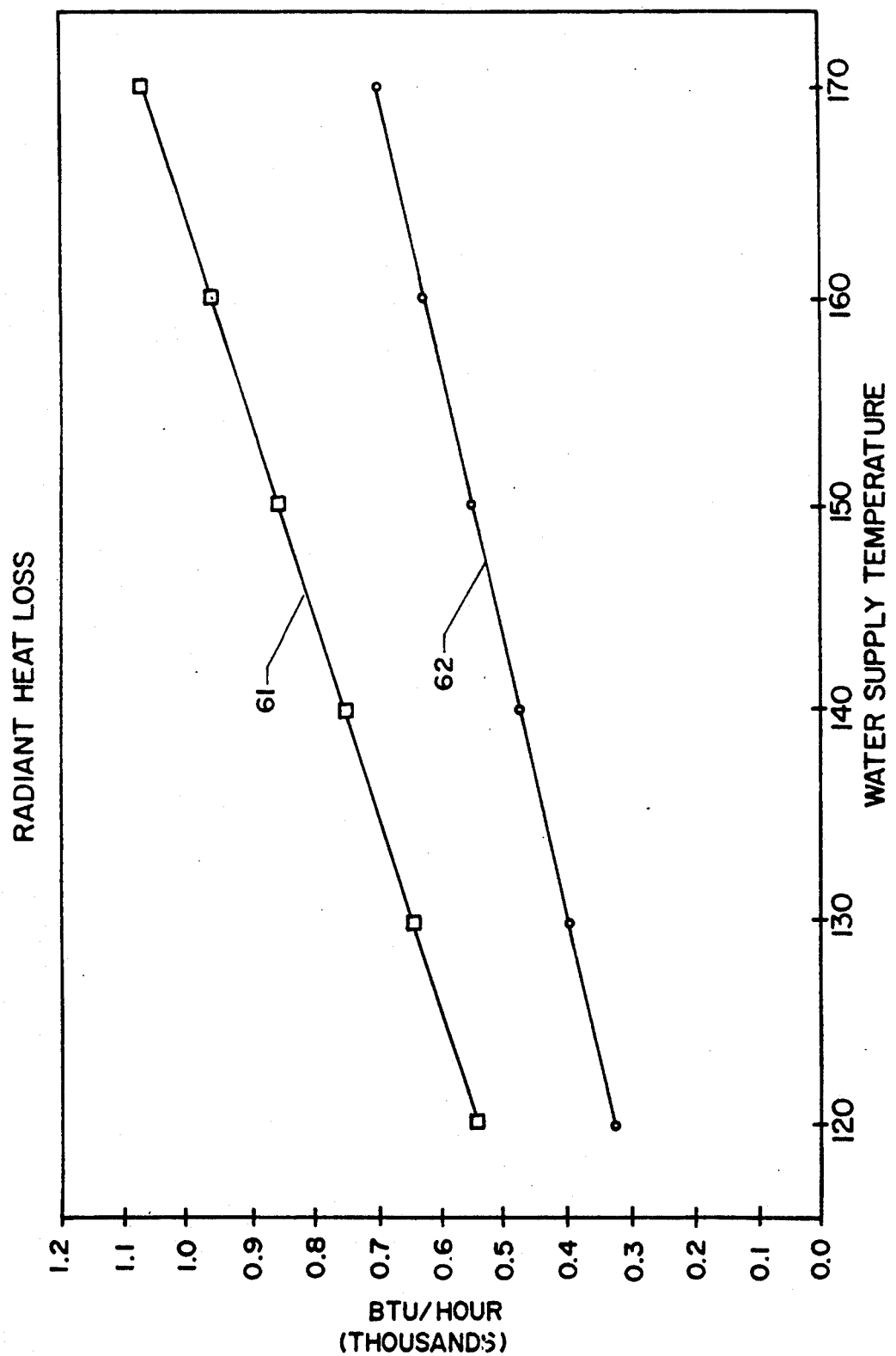
FIG. 3 is a plot of radiant heat loss versus hot water supply temperature.

Referring to FIG. 3, computer analysis shows the relative loss for a separate pre-heater tank combined with a conventional hot water tank compared to the baffled tank. Plot 61 shows the loss for a preheat tank and conventional hot water tank at various hot water supply temperatures. Plot 62 shows the reduced losses provided by the baffle tank configuration.

The novel feature of the invention include the baffle and circulation port configuration, the provision for both lateral and vertical temperature gradients within the tank and the location of solar collector inlet and return pipes to take advantage of these gradients. The advantage provided include the increase in efficiency of the solar panel, the effective elimination of radiant losses from the inner supply tank, the remaining loss being recovered by the annular preheat volume, and reduction of the potential heat loss through the solar collectors.

Although the invention has been described relative to a specific embodiment thereof, there are numerous variations and modifications that will be readily apparent to those skilled in the art in the light of the above teachings. For example, the tank assembly may be formed in an oval shape instead of the circular shape previously described, thereby permitting a smaller overall diameter in one direction for the purpose of allowing movement of the tank through smaller doors or openings. It is therefore to be understood that, within the scope of the appended claims, the invention may be practiced other than as specifically described.

What is claimed as new and desired to be secured by Letters Patent of the United States is:

1. A hot water storage tank for a solar collector system comprising:
   a. a cylindrical storage tank;
   b. a cylindrical baffle positioned concentrically within said storage tank, thereby forming an outer annular storage volume and an inner cylindrical storage volume, and having diametrically opposed upper and lower circulation ports thereby allowing transfer of water between the inner and outer volumes;
   c. a cold water inlet providing a cold water supply to a solar collector system and to a first side of the outer annular storage volume;
   d. a collector-water inlet providing pre-heated solar collector water to a second side of the outer annular storage volume;
   e. a hot water outlet connected to the upper part of the inner storage volume of said storage tank;
   f. an electric heater element for providing supplemental heating connected to said cylindrical storage tank and extending inward through the outer annular storage volume and through the upper circulation port into the inner cylindrical storage volume;
   g. a relief valve for venting excess pressure connected to the upper part of said cylindrical storage tank; and
   h. a drain connected to the lower part of said cylindrical storage tank.

2. A hot water storage tank for a solar collector system comprising;
   a. means for storing water;
   b. a cylindrical baffle positioned concentrically within said means for storing water, thereby forming an outer annular storage volume and an inner cylindrical storage volume, and having diametrically opposed upper and lower circulation ports thereby allowing transfer of water between the inner and outer volumes;
   c. means for circulating water connected to said means for storing water, said means for circulating water including a cold water inlet providing a cold water supply to a solar collector system and to a side of the outer annular storage volume; and d. means for heating water, said means for heating being located within said means for storing water.

3. A hot water storage tank as in claim 2 wherein said means for storing water is a cylindrical tank.

4. A cylindrical tank as in claim 3 wherein said cylindrical tank has a relief valve for venting excess pressure located on the upper surface of the tank.

5. A cylindrical tank as in claim 3 wherein said cylindrical tank has a drain located on a lower part of the tank.

6. A hot water storage tank as in claim 2 wherein said means for storing water is an oval-shaped tank.

7. A hot water storage tank as in claim 2 wherein said means for circulating water further comprises:

a. a solar collector return for returning collector water to the outer annular storage volume; and b. a hot water outlet connected to the upper part of said means for storing water.

8. A hot water storage tank as in claim 2 wherein said means for heating water comprises a supplemental electric heating element extending into the cylindrical hot water storage volume.

* * * * *